United States Patent [19]

Duguet et al.

[11] 4,314,715
[45] Feb. 9, 1982

[54] AUTOMOBILE VEHICLE SEAT STRUCTURE PROVIDED WITH A DEVICE FOR HOOKING SAFETY BELTS

[75] Inventors: Pierre Duguet, Feucherolles; Christian Robert, Rueil Malmaison, both of France

[73] Assignees: Automobiles Peugeot; Societe Anonyme Automobiles Citroen, both of Paris, France

[21] Appl. No.: 121,227

[22] Filed: Feb. 13, 1980

[30] Foreign Application Priority Data

Feb. 21, 1979 [FR] France ................................ 79 04410

[51] Int. Cl.³ .............................................. B60R 21/10
[52] U.S. Cl. ..................................... 280/801; 297/474
[58] Field of Search ............ 280/801; 296/65 R, 65 A; 24/230 A, 230 AP, 230 AT; 297/485, 473, 216, 474, 478

[56] References Cited

U.S. PATENT DOCUMENTS 3,116,092 12/1963 Spanger ............................. 297/474
3,711,153 1/1973 Cunningham ....................... 297/216
4,218,074 8/1980 Crawford ............................ 280/801
4,229,041 10/1980 Werner ............................... 297/216

Primary Examiner—Joseph F. Peters, Jr.
Assistant Examiner—Randall A. Schrecengost
Attorney, Agent, or Firm—Burns, Doane, Swecker & Mathis

[57] ABSTRACT

An arrangement of a seat structure of a vehicle equipped with a hooking device for safety belts. The seat structure comprises a backrest and a seat and the backrest is mounted at the base thereof on the rear of the seat to pivot about a first transverse axis. The seat is mounted in the vicinity of the front part thereof to pivot about a second transverse axis. The hooking device is fixed to the seat and a connecting assembly is provided for connecting the hooking device to the floor of the vehicle. The connecting assembly comprises a latch carried by the hooking device and a keeper which is pivotally mounted on the floor. A device acting in opposition to elastically yieldable apparatuses is provided for maintaining the keeper engaged with the latch when the backrest is in the operative position thereof.

6 Claims, 8 Drawing Figures

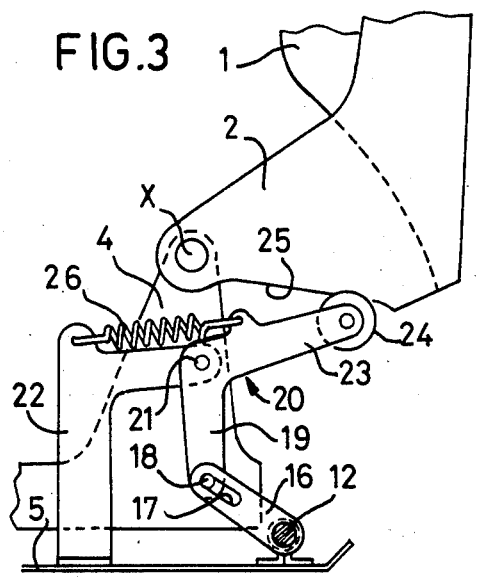
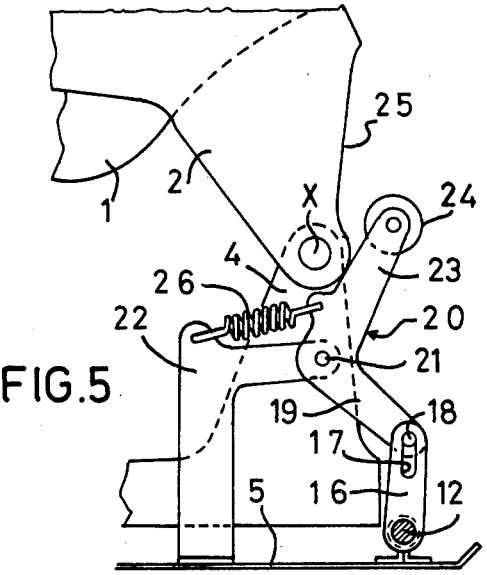
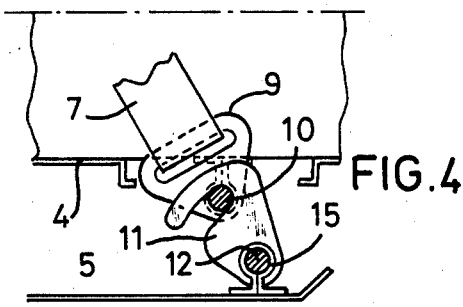
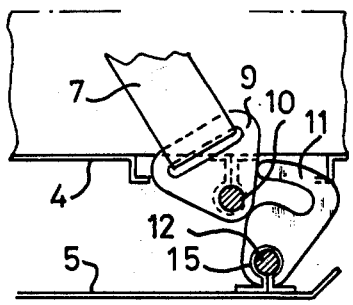
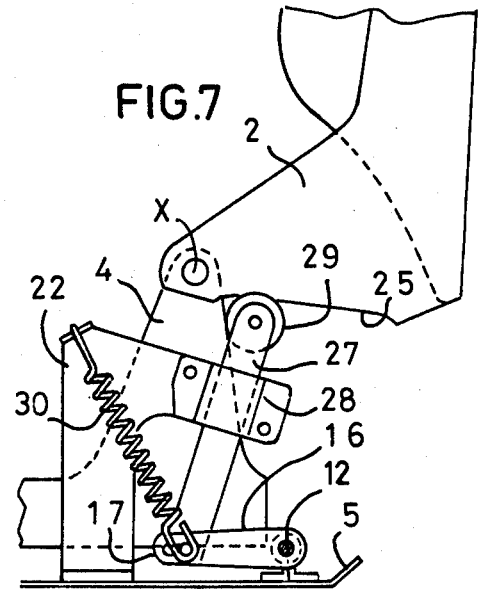
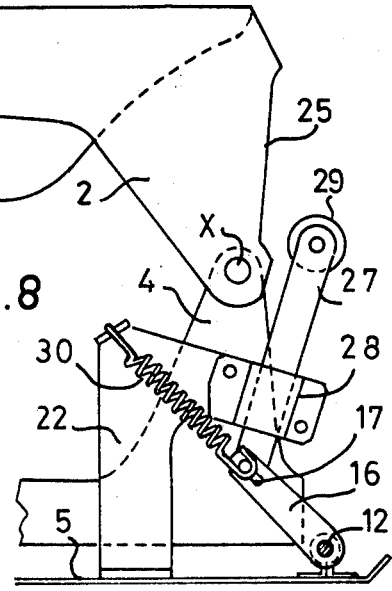

AUTOMOBILE VEHICLE SEAT STRUCTURE PROVIDED WITH A DEVICE FOR HOOKING SAFETY BELTS

DESCRIPTION

The present invention relates to a seat structure which may be converted in such manner as to modify the loading volume of the luggage compartment of an automobile. It is more particularly applicable to a rear seat structure whose backrest is pivoted at its base to the rear of the seat to pivot about a first transverse axis, the seat being itself mounted in the vicinity of its front part to pivot about a second transverse axis.

In a vehicle equipped in this way, the loading volume of the luggage compartment can be increased by folding the backrest horizontally onto the seat, and then raising the backrest-seat assembly to a vertical position behind the backrest of the front seat structures.

When a seat structure which is convertible in this way must be provided with a safety belt for each of its seat places, there must be provided for each belt a hooking device which is located adjacent the rear of the seat in the vicinity of the longitudinal median plane of the vehicle. In order to avoid having to reinforce the structure of the seat structure to an exaggerated extent, it is desirable that these anchoring devices be connected to the floor of the vehicle.

It is for example possible to provide in the seat a passage for arms which are directly fixed to the floor and each comprise hooking means for a belt.

This arrangement has in particular the following drawbacks: the arms and their hooking means rub against the upholstery of the seat upon each movement and results in wear; it is not easy to reintroduce the arms in the passage of the seat when the latter is put back into its operative position.

According to another design, the hooking device for the belt is movable with the seat structure and means are provided for connecting this hooking device to the floor of the vehicle when the seat structure is in the position of use.

The invention relates to the last-mentioned design.

The object of the invention is to provide a particularly simple arrangement which requires no intervention on the part of the user in the course of the conversion of the seat structure and guarantees an effective and reliable positioning.

According to the invention, there is provided an arrangement of a seat structure of a vehicle equipped with a hooking device for safety belts and comprising a backrest and a seat, the backrest being mounted at its base on the rear of the seat to pivot about a first transverse axis, the seat being mounted in the vicinity of its front part to pivot about a second transverse axis, the hooking device being fixed to the seat and connecting means being provided for connecting the hooking device to the floor of the vehicle, wherein said connecting means comprise a latch carried by the hooking device and a keeper which is pivotally mounted on the floor, means acting in opposition to elastic means being provided for maintaining the keeper engaged on the latch when the backrest is in the operative position thereof.

Two embodiments of the invention will now be described with reference to the accompanying drawings in which.

Figure 1:
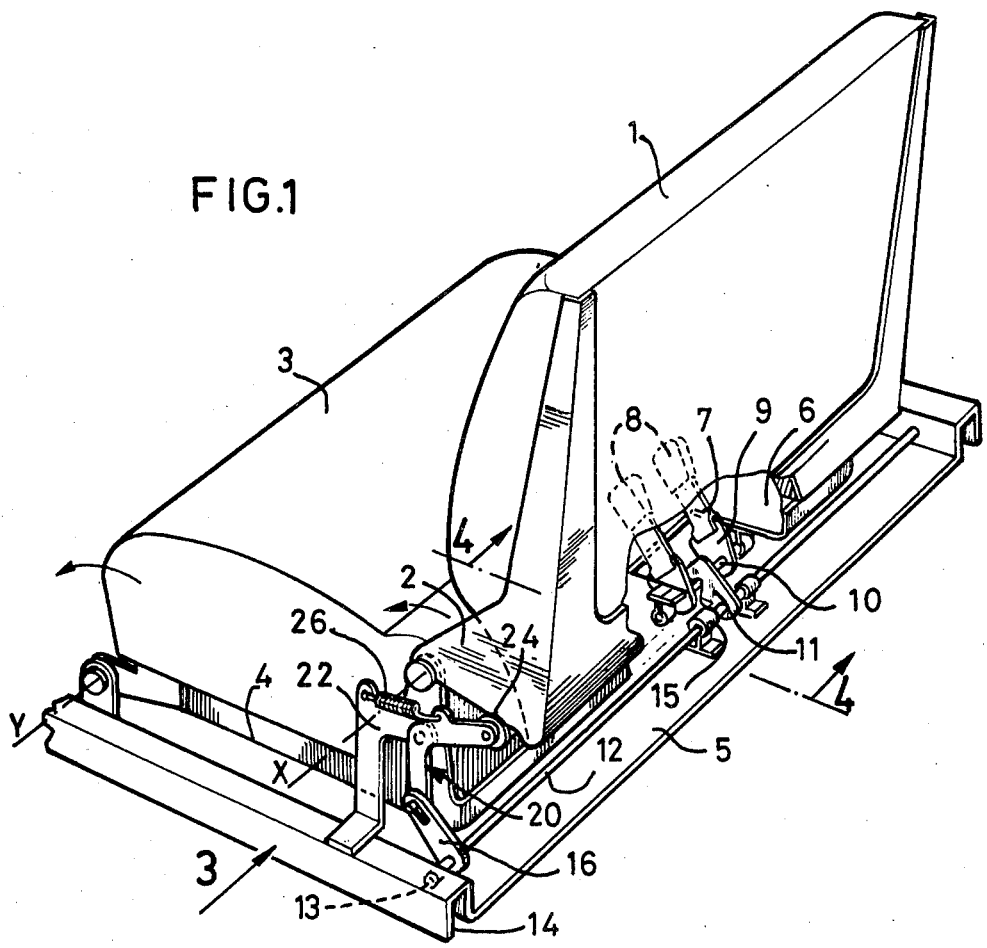
FIG. 1 is a perspective view of a seat structure provided with a hooking device according to a first embodiment of the invention.

FIGS. 3 and 4 are views to an enlarged scale taken in the direction of arrows 3 and 4 of FIG. 1, the seat structure being in the operative position thereof;

FIGS. 5 and 6 correspond respectively to FIGS. 3 and 4, the backrest having been folded over onto the seat;

FIGS. 7 and 8 show a second embodiment of the invention and correspond respectively to FIGS. 3 and 5.

The first embodiment of the invention will first be described. A rear vehicle seat structure comprises mainly a backrest 1 provided with a reinforcement 2, and a seat 3 provided with a reinforcement 4. The backrest 1 is mounted at the base thereof on the rear of the seat 3 to pivot about a first transverse axis X and the seat is mounted in the front part thereof on the floor 5 of the vehicle to pivot about a second transverse axis Y.

Locking means, which are well known in the art and have not been illustrated, maintain the backrest 1 in the normal position of use in the conventional manner.

Figure 2:
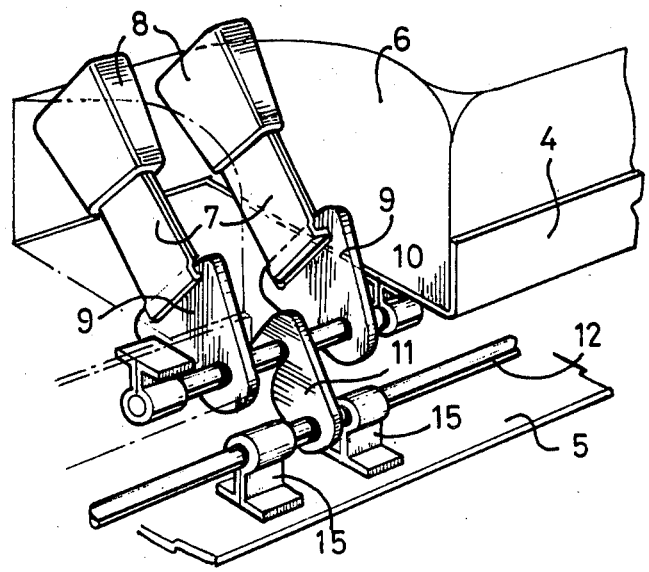
FIG. 2 shows a detail to an enlarged scale of FIG. 1.

As shown in FIG. 2, in the vicinity of the rear median part of the seat 3, there is provided a recess 6 for the passage of arms 7 each of which are provided with hooking means 8 for a safety belt (not shown).

Each arm is connected to a plate 9 and the two plates are carried by a rod 10 which is rigid with the reinforcement 4 of the seat and is disposed in the recess 6, this rod extending transversely of the vehicle.

The rod 10 constitutes a latch adapted to cooperate with a keeper 11 which is rigid with a transverse rod 12 which is rotatably mounted relative to the floor 5. This rod is held in position, at the end thereof, in recesses 13 formed in ribs 14 of the floor and, in the vicinity of its centre part, in members 15 located on each side, and in the immediate vicinity, of the keeper 11.

Fixed on one of the ends of the rod 12 is a lever 16 provided with an oblong aperture 17 in which a finger member 18 carried by a first arm 19 of a lever 20 is engaged. The lever 20 is pivotally mounted on a pin 21 carried by a support 22 fixed to the floor 5.

A second arm 23 of the lever 20 carries a roller 24 which is adapted to co-operate with a ramp 25 formed on the reinforcement 2 of the backrest 1.

A spring 26 disposed between the lever 2 and the support 22 biases the roller 24 against the ramp 25.

The arrangement just described operates in the following manner:

When the seat structure is in its normal position of use as shown in FIG. 1, the ramp 25 of the reinforcement 2 bears against the lever 20 in opposition to the action of the spring 26. The lever 20 then maintains the lever 16 in such position that the keeper 11 is engaged on the latch 10. In the event of a pull being exerted by the safety belt, the corresponding force is transmitted to the floor 5 through the arm 7, the plate 9, the latch 10, the rod 12 and the members 15.

As soon as the backrest 1 is folded over onto the seat 3, the lever 20 which is released from the ramp 25 is driven by the spring 26 so that the rod 12 is rotated and the keeper 11 is withdrawn from the latch 10. It is then possible to raise the seat 3 by pivoting it about the axis Y.

The seat structure may be placed back/into position by the reverse operations, with no need to be concerned about the hooking device of the belt.

The modification shown partly in FIGS. 7 and 8 differ from the foregoing embodiment, only in that the pivotal lever 20 is replaced by a lever 27 which is slidably mounted in a guide 28 which is part of the support 22. As in the foregoing embodiment, the lever 27 is pivoted at one end to the lever 16 and carries at its other end a roller 29 which is adapted to co-operate with a ramp which is similar to the ramp 25 of the device of FIG. 3. A spring 30 having the same function as the spring 26 is mounted between the support 22 and the pivotal mounting of the second lever on the first. This device operates in a similar way to the first embodiment.

Having now described our invention what we claim as new and desire to secure by Letters Patent is:

1. An arrangement comprising in combination with a vehicle having a floor, a hooking device for safety belts, a seat structure comprising a backrest and a seat, the backrest being mounted at the base thereof on a rear part of the seat to pivot about a first transverse axis between an operative position and an inoperative position, the seat being pivotally mounted on the floor in the vicinity of the front part of the seat to pivot about a second transverse axis, and connecting means for connecting the hooking device to the floor, said connecting means comprising a latch carried by the hooking device, a keeper pivotally mounted on the floor, maintaining means associated with the keeper for maintaining the keeper engaged with the latch when the backrest is in said operative position, and elastically yieldable means biasing the maintaining means in a direction for releasing the keeper from the latch.

2. An arrangement as claimed in claim 1, comprising a recess in a rear median part of the seat, a reinforcement for the seat, the hooking device being disposed in the recess and the latch comprising a rod which is rigid with the reinforcement of the seat and extends across the recess transversely of the vehicle.

3. An arrangement as claimed in claim 2, comprising a reinforcement for the backrest, a second transverse rod which is rotatively mounted relative to the floor and is rigid with the keeper, said means for holding the keeper comprising a first lever fixed adjacent one end of said second rod, a second lever which is pivotally mounted on the first lever and a roller is carried by the second lever at an end of the second lever opposed to its pivotal mounting, a ramp carried on the reinforcement of the backrest being cooperative with the roller.

4. An arrangement as claimed in claim 3, comprising a support fixed to the floor and carrying a pin, said second lever comprising a first arm pivotally mounted on the pin and a second arm carrying said roller, said elastically yieldable means comprising a spring which is disposed between said second lever and said support.

5. An arrangement as claimed in claim 3, comprising a support fixed to the floor and defining a guide, said second lever being slidably mounted in the guide and said elastically yieldable means comprising a spring which is disposed between the pivotal mounting of said second lever and said support.

6. An arrangement as claimed in any one of the claims 2 to 5, wherein the hooking device for safety belts comprises, for each belt, an arm provided with hooking means and a corresponding plate being connected to the arm and carried by said rod which forms a latch.

* * * * *